E. WISROTH.
ICE CREAM VENDING MACHINE.
APPLICATION FILED APR. 28, 1921.

1,431,437.

Patented Oct. 10, 1922.
2 SHEETS—SHEET 1.

INVENTOR
Ernst Wisroth.
by Hazard & Miller
ATTYS.

E. WISROTH.
ICE CREAM VENDING MACHINE.
APPLICATION FILED APR. 28, 1921.
1,431,437.
Patented Oct. 10, 1922.
2 SHEETS—SHEET 2.
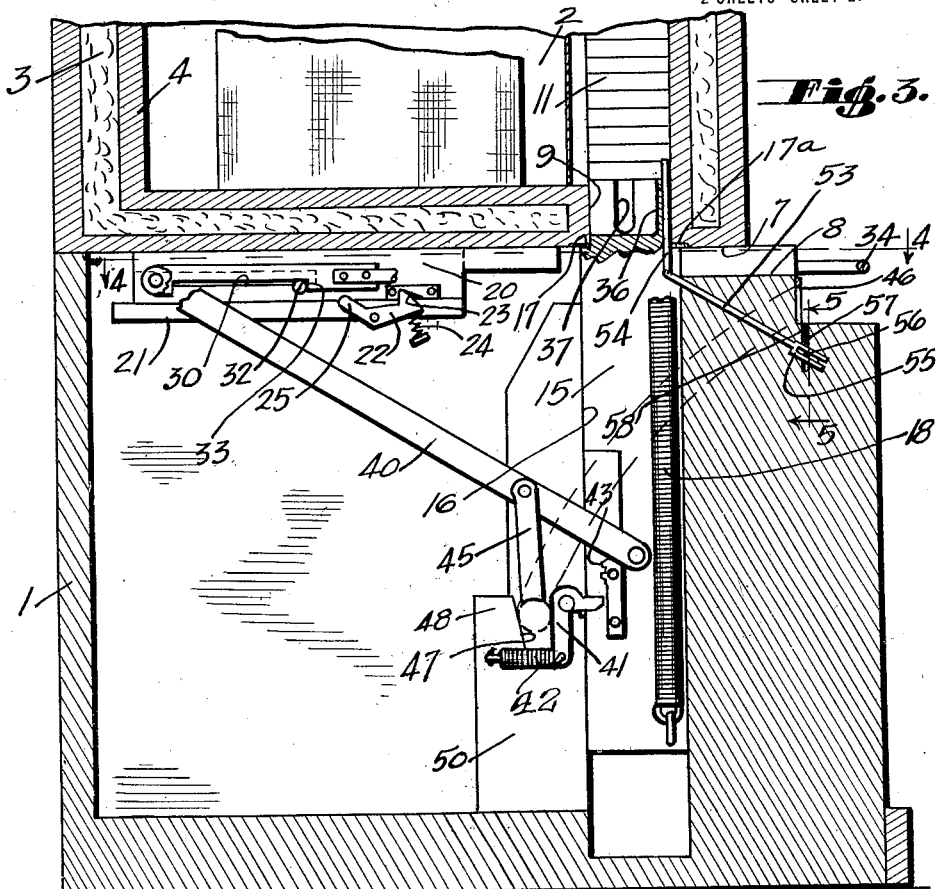
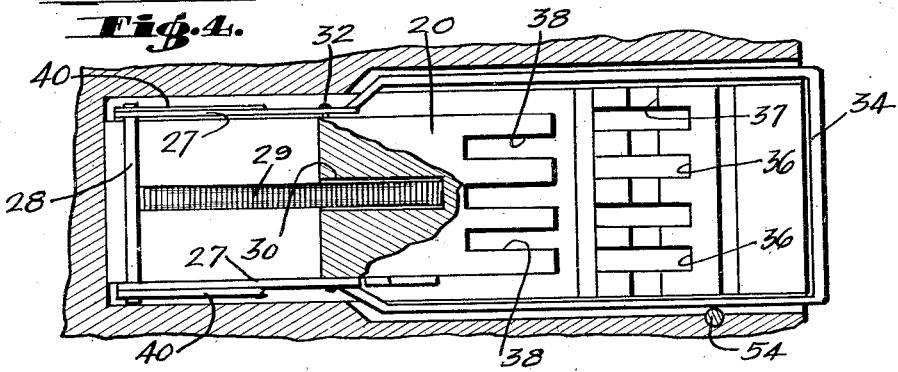
INVENTOR
Ernst Wisroth.
by Hazard & Miller
ATTYS.

Patented Oct. 10, 1922.

1,431,437

UNITED STATES PATENT OFFICE.

ERNST WISROTH, OF VENICE, CALIFORNIA, ASSIGNOR OF ONE-HALF TO REGINALD D. RAPHAEL.

ICE-CREAM-VENDING MACHINE.

Application filed April 28, 1921. Serial No. 465,160.

*To all whom it may concern:*

Be it known that I, ERNST WISROTH, a citizen of the United States, residing at Venice, in the county of Los Angeles and State of California, have invented new and useful Improvements in Ice-Cream-Vending Machines, of which the following is a specification.

This invention is a vending machine particularly adapted to be employed for dispensing bricks of ice cream. The improved mechanism comprises a plurality of superimposed blocks of ice cream which are to be sold, and a coin controlled mechanism for releasing a block beneath the stack of ice cream blocks, so that the lowermost ice cream block may be brought into alinement with a discharge opening and forced outwardly through the same, the controlling block as thus described, being so arranged that, after discharge of an ice cream block, the remaining blocks of the stack will be returned to a position within a refrigerating receptacle.

The improved mechanism also includes novel means for indicating when the apparatus is empty, and for moving a closure plate over the coin slot of the vending machine in order that no coins may be inserted until the device has been refilled.

The invention will be readily understood from the following description of the accompanying drawings, in which:

Fig. 3 is a detail vertical section on the line 3—3 of Fig. 1.

Fig. 4 is a horizontal section on the line 4—4 of Fig. 3.

Fig. 5 is a detail section on the line 5—5 of Fig. 3.

Figure 1:
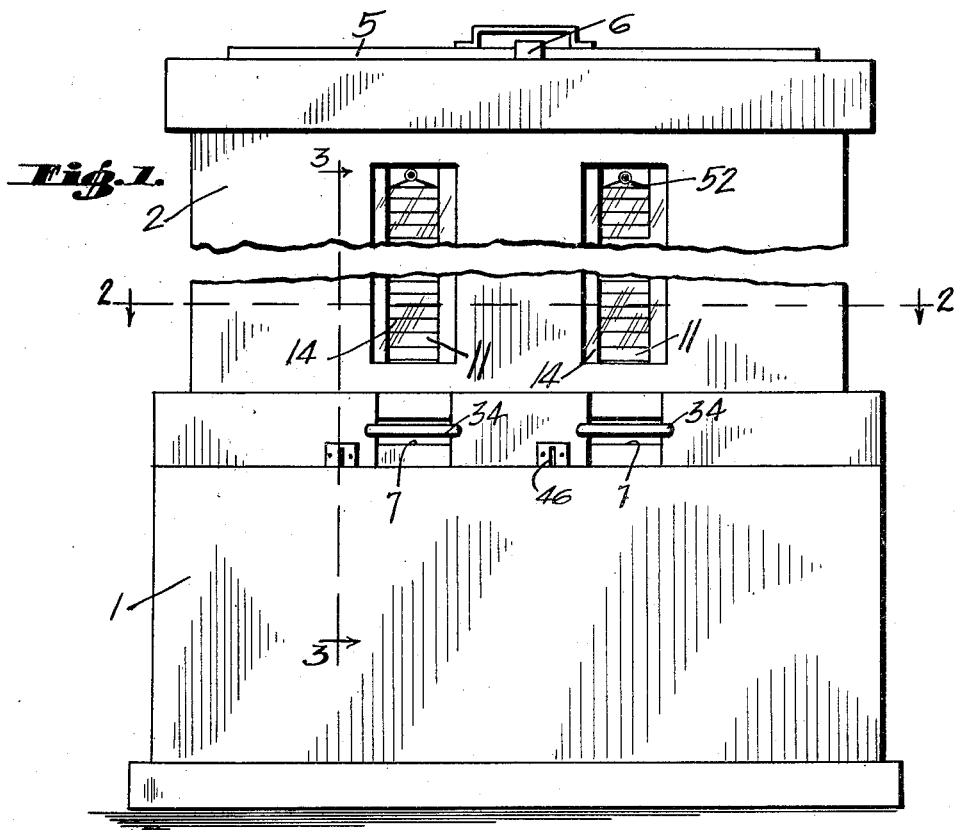
Figure 1 is a front elevation of the device constructed in accordance with the invention.
Figure 2:
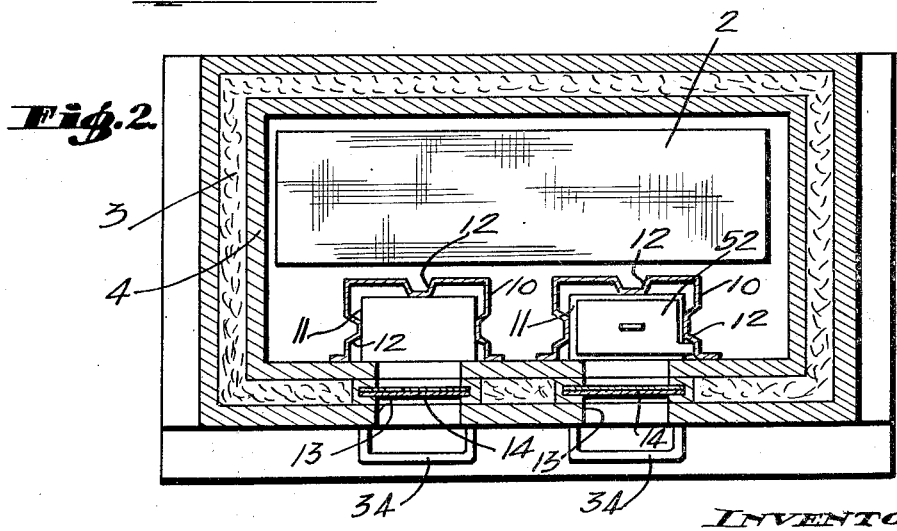
Fig. 2 is a horizontal section on the line 2—2 of Fig. 1.

The improved vending machine is mounted in a suitable casing and preferably includes a plurality of units which are similar in construction, and therefore one of said units will be described. In the form of the invention illustrated I have shown a machine comprising two of the vending units.

The base of the casing is shown at 1 as a hollow structure carrying the operating parts for the respective vending units, and an ice box 2 is arranged above a hollow base structure 1. The ice box is preferably provided with insulating material 3 arranged in the space formed by an inner wall 4 of said box, and ice may be placed within the ice box through a suitable opening provided therein and covered by a lid 5 provided with locking means 6.

Each of the vending units has a discharge opening 7 formed at the front of the apparatus and preferably at the base of the ice box and at the top of the lower casing 1 which forms a shelving 8 upon which an article discharged from the vending set is received. A vertical guideway is formed in the ice box in alinement with opening 7, and said guideway extends upwardly from a base opening 9 in the ice box and through which one of the superimposed stack of articles in the guideway is discharged to a point in alinement with discharge opening 7, so that it may be forced outwardly through said opening.

The guideway extending upwardly within the ice box is preferably a sheet metal structure 10 adapted to hold a stack of articles to be vended, such as bricks of ice cream 11. The guideway is preferably formed with inwardly extending spaced ribs 12 which abut against the stack of articles 11 so as to space the same from the main wall of the guideway and thereby reduce the transferring of heat by conduction, and also provide for the circulation of cooling air around the stack of blocks. The front of the ice box is preferably provided with a window 13 through which the stack of ice cream blocks may be observed, and said window has a glass 14 inserted therein.

A vertically movable block 15 is arranged in a guideway 16 in the main casing 1, and said block is beneath the stack of articles 11. The upward movement of this block is limited by shoulders 17 upon the same abutting against the edge of the ice box, and a cushioning member shown as a gasket 17ª is preferably interposed between the shoulders and the ice box. When block 15 is in its uppermost position, the stack of blocks 11 rests upon the same so as to support said blocks above discharge opening 7 and the block is normally yieldably urged upwardly into this position by means of spring 18 connected at its respective ends to the block and to the frame of the casing. It will be noticed that when the block is in its uppermost position, discharge opening 7 is closed by the same, and that the discharge of a block of ice cream is thus prevented.

The means employed for moving block 15 downwardly so that the lowermost block of ice cream will aline with discharge opening 7, includes a block 20 laterally horizontally movable in a suitable guideway 21 in rear of discharge opening 7 and the block 15. This block is normally held in a retracted position by means of a catch 22 pivoted upon guideway 21 and adapted to engage in a recess 23 of the block. The catch may be yieldably held in engaging position by means of a spring 24 and is provided with a projecting lug 25 which, when engaged by mechanism to be hereinafter described, will release said catch and thereby permit forward movement of block 20 as will be set forth.

Arms 27 are mounted at the sides of block 20 and extend rearwardly therefrom, and the rear ends of said arms are connected by a cross bar 28 having one end of the coil spring 29 secured to the same. The opposite end of the spring is received in a recess 30 in the rear end of block 20, so that the block is normally moved forwardly between arms 27. The forward movement of the block with relation to the arms may be limited by pins 32 projecting from the block and received against shoulders 33 on the arms. The arms 27 extend forwardly through the main casing of the apparatus so as to terminate in a handle loop 34 beyond discharge opening 7, and by the construction as thus described it will be seen that when the handle is drawn out, cross bar 28 will be moved forwardly, while the block 20 is held against movement by catch 22, and when said catch is released, as will be described, the block will be projected forwardly by spring 29 so as to force a block of ice cream which has been moved down with block 15 until it is in alinement with discharge opening 7, outwardly through said discharge opening.

The upper end of block 15 is preferably provided with spaced grooves 36 extending from front to back of the apparatus, and also with a transverse groove 37 arranged in the portions of the block separating the grooves 36. The blocks of ice cream resting upon its grooved end of block 15 affords a construction wherein circulation is permitted around the base of the stack of ice cream blocks while supporting the latter so as to eliminate the transfer of heat by conduction.

The forward end of block 20 is preferably grooved as shown at 38 so that said grooves will aline with the portions of block 15 between grooves 36, and as a consequence when block 15 has been depressed and block 20 has been projected forwardly so as to overlie the same and force the lowermost block of ice cream outwardly through discharge opening 7, the subsequent elevation of block 15, as block 20 is being retracted, and as will be hereinafter described, will be made possible without said blocks interfering with one another, since the upper end of block 15 may move upwardly through the grooves 38 of block 20 until the latter block has been sufficiently retracted to move the same completely out of alinement with block 15.

The means employed for depressing block 15 against the tension of spring 18 includes links 40 pivoted at one end to cross rod 28 and at their opposite end pivoted to block 15, so that when handle 34 is drawn forwardly, the movement imparted to the links will depress block 15, if the latter has been released by the coin control mechanism.

This coin controlled releasing mechanism includes a catch 41 pivoted in the casing of the apparatus and normally swung into a position by means of spring 42 to cause engagement of said catch with a toothed member 43 upon block 15, so that said block is held against downward movement. An operating finger 45 depends from link 40 and is so arranged that a coin inserted in a suitable coin slot 46 will be positioned beyond the end of the operating finger and in a tapering guideway 47 formed by catch 41 and a block 48 carried by the main casing. As a consequence when handle 34 is drawn forwardly, the tendency of link 40 to swing downwardly will cause the finger 45 to push the coin downwardly, as above described, through the tapering guideway, and as a result catch 41 is swung upon its pivot so as to release block 15 for downward movement as the pull upon handle 34 continues. The coin as it passes beyond the slot will drop to a suitable collecting receptacle 50, and when the handle 34 is subsequently released the block 15 will be again elevated by spring 18 so as to return the stack of ice cream blocks to the refrigerating chamber and also cause catch 41 to again engage beneath teeth 43.

The apparatus, as thus described, preferably includes means for indicating when a stack of ice cream blocks have all been dispensed, and said indicating means is displayed at a point overlying the entrance to coin slot 46 in order that no money may be inserted in the machine when the latter is empty. As an instance of this arrangement a follower 52 is arranged upon the stack of ice cream blocks, and when said stack has been dispensed, the follower is lowered to a position for engaging actuating mechanism controlling the indicating means.

The mechanism actuated by follower 52 includes a link 53 pivoted in the machine and having an upstanding finger 54 pivoted at one end, and so arranged that when the follower has been lowered to a position where the guideway for the stack of ice cream blocks is empty, said finger will be engaged by said follower to cause swinging movement of the link 53. The opposite end of this link is formed as a forked member 55 adapted to engage a pin 56 projecting from a plate 57 movable in a guideway 58 and adapted to be normally retracted below the entrance to coin slot 46. Swinging movement of link 53 is arranged to elevate the plate 57 in its guideway and to a point overlying the entrance to the coin slot. The plate 57 may be provided with suitable indicating means, as the word "EMPTY."

The construction, as thus described, provides a convenient apparatus for dispensing ice cream blocks and the like, and so arranged as to maintain the blocks within a refrigerating chamber when the apparatus is not being operated, while permitting of the discharge of one of said blocks from the refrigerating chamber when the machine is actuated through the functioning of a coin control mechanism.

Various changes may be made without departing from the spirit of the invention as claimed.

What is claimed is:

1. A vending machine having a discharge opening and carrying a plurality of superimposed articles, a block supporting said articles and normally elevated to lift said articles above said discharge opening, an operating member, coin controlled releasing means for the same, a spring actuated pusher block, and actuating means moved by said operating member to first depress the article supporting block in order to aline one of said articles with said discharge opening and then functioning to release said pusher block so that movement thereof will discharge said alined article through said opening.

2. A vending machine comprising a dispensing magazine having a discharge opening, a block for supporting articles in the magazine and movable to control said discharge opening, means for normally urging the supporting block to restricting position with respect to said discharge opening, an ejecting block movable at right angles to the supporting block and into and out of said discharge opening, said supporting and ejecting blocks having interfitting ends to permit the retraction of the ejecting block simultaneously with the elevation of the supporting block, and coin controlled mechanism for actuating said blocks.

3. A vending machine comprising a dispensing magazine having a discharge opening, a block adapted to support the articles within the magazine and movable to control said discharge opening, an ejecting block movable into and out of said discharge opening and across said magazine for effecting an ejection of the articles from the magazine, means for normally urging the ejecting block toward said discharge opening, means for latching the ejecting block in retracted position, means for normally urging the supporting block to a position spanning the discharge opening, means for latching the supporting block in retracted position, and coin controlled manually operable means for releasing said latching means to permit actuation of said blocks and for retracting said blocks.

4. A vending machine comprising a dispensing magazine having a discharge opening, a block for supporting articles within the magazine and controlling said discharge opening, an ejecting block movable across the magazine and into said discharge opening, means normally acting to move the supporting block across said discharge opening and the ejecting block into said discharge opening, latches for retaining the blocks in retracted position against the action of said urging means, arms connected to the ejecting block and extending exteriorly to the machine to provide a handle, and a link operatively connecting the ejecting and supporting blocks to effect actuation of the latter upon actuation of the ejecting block.

In testimony whereof I have signed my name to this specification.

ERNST WISROTH.